United States Patent
Chen (10) Patent No.: US 11,297,141 B2
(45) Date of Patent: *Apr. 5, 2022

(54) FILESYSTEM I/O SCHEDULER

(71) Applicant: Red Hat, Inc., Raleigh, NC (US)

(72) Inventor: Huamin Chen, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/860,948

(22) Filed: Apr. 28, 2020

(65) Prior Publication Data
US 2020/0259902 A1    Aug. 13, 2020

Related U.S. Application Data

(63) Continuation of application No. 14/944,739, filed on Nov. 18, 2015, now Pat. No. 10,645,162.

(51) Int. Cl.
| | | |
|---|---|---|
| *G06F 15/167* | (2006.01) | |
| *H04L 67/1097* | (2022.01) | |
| *G06F 16/22* | (2019.01) | |
| *G06F 16/182* | (2019.01) | |
| *H04L 67/61* | (2022.01) | |
| *H04L 67/63* | (2022.01) | |

(52) U.S. Cl.
CPC ........ *H04L 67/1097* (2013.01); *G06F 16/183* (2019.01); *G06F 16/22* (2019.01); *H04L 67/322* (2013.01); *H04L 67/327* (2013.01)

(58) Field of Classification Search
CPC .................................................... G06F 16/182
See application file for complete search history.

(56) References Cited

U.S. PATENT DOCUMENTS

| | | |
|---|---|---|
| 6,078,998 A | 6/2000 | Kamel et al. |
| 6,434,631 B1 | 8/2002 | Bruno et al. |
| 7,305,537 B1 | 12/2007 | Moore et al. |

(Continued)

OTHER PUBLICATIONS

"Isolation in Private Database Clouds" http://www.oracle.com/technetwork/database/database-cloud/isolation-in-pvt-db-clouds-1652083.pdf, Jun. 2012, 16 pages.

(Continued)

*Primary Examiner* — Dustin Nguyen
(74) *Attorney, Agent, or Firm* — Haynes and Boone, LLP (57) ABSTRACT

A method includes creating an application instance that corresponds to a client, creating a partition on the cloud storage device, the partition corresponding to the client, and associating attributes with the partition. The attributes include a client identifier corresponding to the client, a service-level objective corresponding to the client, and an application identifier corresponding to the application instance. The method further includes receiving a request from the application instance to access the partition and accessing, in response to the request, the attributes corresponding to the partition. The method further includes ordering the request in a data structure relative to one or more other requests, the ordering based on at least one attribute of the attributes, an order in which the request was submitted, and a latency sensitivity of the application instance. The method further includes dispatching the request from the data structure in an order corresponding to the ordering.

18 Claims, 3 Drawing Sheets

(56) References Cited

U.S. PATENT DOCUMENTS

| | | |
|---|---|---|
| 8,156,226 B2 | 4/2012 | Gasca et al. |
| 8,316,125 B2 | 11/2012 | DeHaan |
| 8,352,941 B1 | 1/2013 | Protopopov et al. |
| 8,407,366 B2 | 3/2013 | Alkhatib et al. |
| 8,429,097 B1 | 4/2013 | Sivasubramanian et al. |
| 8,438,138 B2 | 5/2013 | Rath et al. |
| 8,768,875 B2 | 7/2014 | Xiong et al. |
| 8,972,551 B1 | 3/2015 | Yanacek et al. |
| 9,477,710 B2 | 10/2016 | Narasayya et al. |
| 2006/0064697 A1 | 3/2006 | Kagi et al. |
| 2009/0300642 A1 | 12/2009 | Thaler et al. |
| 2010/0083262 A1 | 4/2010 | Gulati et al. |
| 2010/0306767 A1 | 12/2010 | DeHaan |
| 2011/0153697 A1 | 6/2011 | Nickolov et al. |
| 2012/0078948 A1 | 3/2012 | Darcy |
| 2013/0205295 A1 | 8/2013 | Ebcioglu et al. |
| 2014/0059551 A1 | 2/2014 | Umanesan |
| 2014/0068703 A1 | 3/2014 | Balus et al. |
| 2014/0089282 A1 | 3/2014 | Sampathkumar |
| 2014/0101298 A1 | 4/2014 | Shukla et al. |
| 2014/0108474 A1* | 4/2014 | David ............... G06F 16/182 707/827 |
| 2014/0130055 A1 | 5/2014 | Guha |
| 2014/0215590 A1 | 7/2014 | Brand |
| 2014/0379924 A1 | 12/2014 | Das et al. |

OTHER PUBLICATIONS

"Designing Secure Multi-Tenancy into Virtualized Data Centers" http://www.cisco.com/c/en/us/td/docs/solutions/Enterprise/Data_Center/Virtualization/securecidg.html, Dec. 7, 2009, 90 pages.

Nicholas Trevor Rutherford, "Elastic Cloud Storage Control for Non-Uniform Workloads" http://www.diva-portal.org/smash/get/diva2:547807/FULLTEXT01.pdf, Master of Science Thesis; Stockholm, Sweden 2012, 66 pages.

* cited by examiner

FILESYSTEM I/O SCHEDULER

PRIORITY INFORMATION

This application is a continuation of U.S. patent application Ser. No. 14/944,739 filed Nov. 18, 2015 and entitled "Filesystem I/O Scheduler," now U.S. Pat. No. 10,645,162, the disclosure of which is hereby incorporated by reference in the entirety.

BACKGROUND

The present disclosure relates generally to cloud storage systems, and more particularly to scheduling input/output (I/O) in cloud storage systems.

Cloud storage systems face challenges that are absent in storage systems that are deployed in traditional data centers. For example, with respect to cloud storage systems, clients may negotiate Service-Level Objectives (SLOs) with providers of cloud storage systems. These SLOs may also be referred to as Service-Level Agreements (SLAs). SLOs may specify particular metrics/thresholds that the cloud storage systems are expected to provide for each of the clients. For example, a client may negotiate with a cloud storage system provider that particular operations should be processed within a particular amount of time, a particular amount of storage should be provided, and so forth. These SLOs may vary based on the particular client, such that a cloud storage system may have a plurality of different SLOs that the cloud storage system is expected to meet.

Traditional data centers may employ a centralized journaling device (also known as a transaction log or a write-ahead log) that serializes data updates, maintains consistency of stored data, and achieves high availability. However, the use of such a journaling device in a cloud storage system may create a bottleneck that causes the cloud storage environment to fail to meet SLOs with respect to particular clients. For example, requests from a first client may be blocked from further processing by earlier submitted requests from another client that are being processed. Accordingly, an SLO corresponding to the first client may not be achieved.

Therefore, a need exists for systems and techniques to maintain data consistency and high-availability in a data storage environment while meeting performance expectations of clients. Thus, while existing cloud storage systems have been generally adequate, the techniques described herein improve performance.

BRIEF SUMMARY

According to an example, a method includes creating an application instance that corresponds to a client. The method further includes creating a partition on a cloud storage device, the partition corresponding to the client. The method further includes associating attributes with the partition, the attributes including a client identifier corresponding to the client, a service-level objective corresponding to the client, and an application identifier corresponding to the application instance. The method further includes receiving a request from the application instance to access the partition. The method further includes ordering the request in a data structure relative to one or more other requests, the ordering based on at least one attribute of the attributes. The method further includes dispatching the request from the data structure in an order corresponding to the ordering.

According to another example, a system includes a processor and a memory. The system further includes a data structure stored in the memory that includes a plurality of requests. The system further includes an application instance executed by the processor that inserts a request of the plurality of requests into the data structure. The system further includes a partition that is assigned to a client, the partition associated with attributes that include: a client identifier, a service-level objective, and an application identifier corresponding to the application instance The system further includes a filesystem that orders, based on the attributes, the request relative to the other requests of the plurality of requests.

According to another example, a non-transitory machine-readable medium includes a plurality of machine-readable instructions that when executed by one or more processors cause the one or more processors to create an application instance that corresponds to a client. The one or more processors are further to receive a request from the application instance to access a partition that is assigned to the client, the partition providing access to a shared filesystem. The one or more processors are further to associate an attribute with the partition, the attribute selected from the group consisting of: a client identifier corresponding to the client, a service-level objective corresponding to the client, and an application identifier corresponding to the application instance. The one or more processors are further to order, based on the attribute, the request in a data structure relative to one or more other requests; and dispatch the request from the data structure according to the order.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
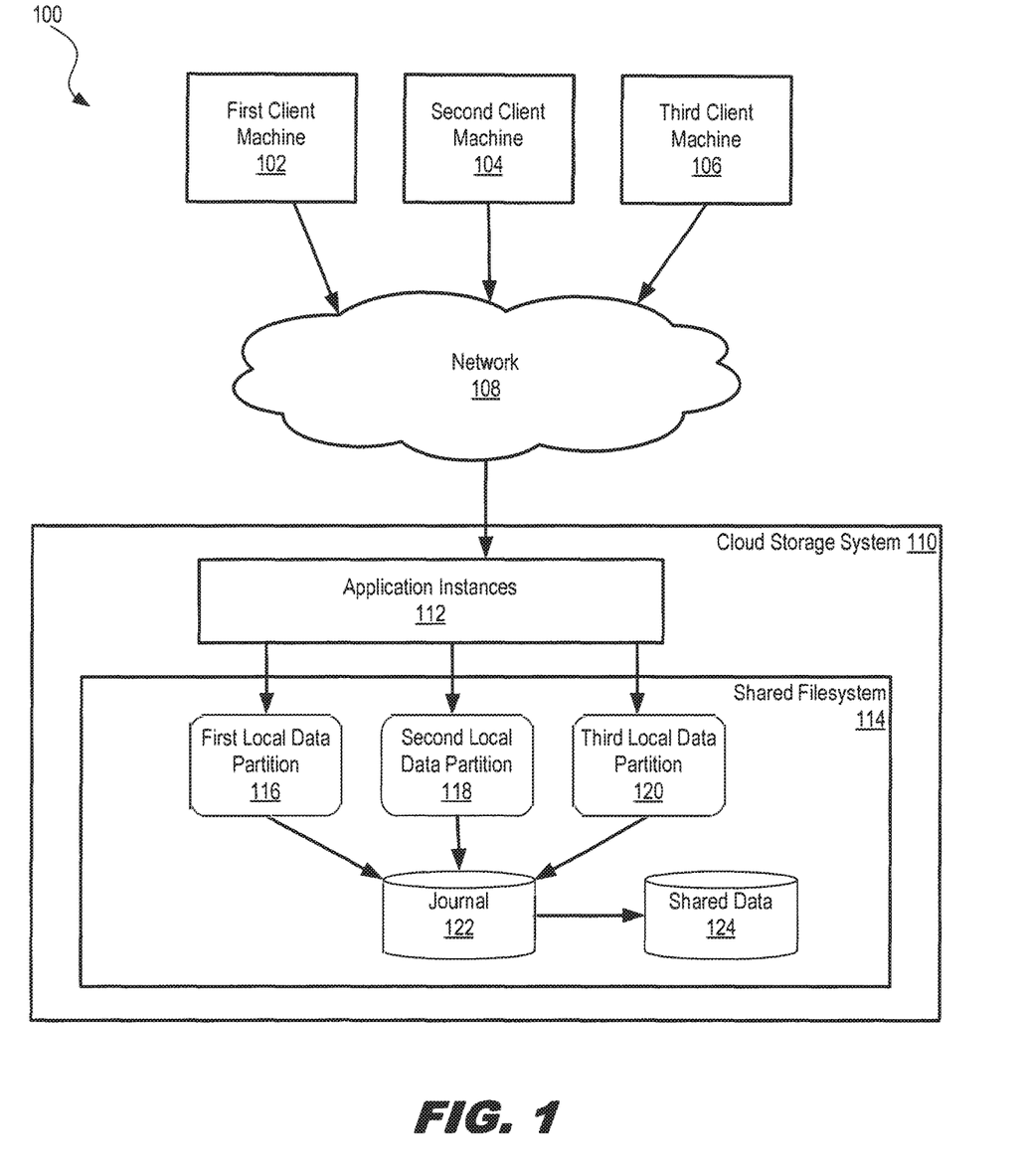
FIG. 1 is an organizational diagram illustrating a cloud computing system, in accordance with various examples of the present disclosure.

FIG. 1 is an organizational diagram illustrating a cloud computing system 100, in which various aspects of the present disclosure may be implemented.

The cloud computing system 100 includes client machines, such as a first client machine 102, a second client machine 104, and a third client machine 106. In other examples there may be fewer or additional client machines. In the present example, each of the client machines is structured as a computing device, such as a rack mount server, desktop computer, laptop computer, handheld/mobile computing device, or other computing device. In some examples, each client may be associated with a plurality of machines. For example, the first client machine 102 may include a plurality of machines that correspond to a particular client.

The client machines are structured to connect to a cloud storage system 110 via a network 108. In the present example, the network 108 may include one or more sub-networks. For example, client machines (e.g., first client machine 102, second client machine 104, and third client machine 106) may be connected to the cloud storage system 110 via one or more internet networks, while cloud storage system 110 may include a plurality of computing devices that are connected via one or more intranet networks. The network 108 may include any combination of public and/or private networks. The network 108 may include one or more network devices and transport media that are communicatively coupled via transport media. For example, network devices may include routers, hubs, switches, and so forth. Transport media may include, for example, Ethernet cable, Fibre Channel Cable, wireless signals, and so forth.

In the present example, the network 108 is structured to route client requests from the client machines to the cloud storage system 110 via TCP/IP, remote procedure calls, SCSI commands, SCSI commands encapsulated in Fibre Channel frames, and/or any other message/signal routing protocol. A request may include any message and/or signal that may be processed by the cloud storage system 110 to perform an I/O operation. For example, a request may be a write request that specifies data to be written to memory included in the cloud storage system 110. In another example, the request may be a read and/or execute request that specifies data to be read and/or executed from the memory included in the cloud storage system 110.

In the present example, the cloud storage system 110 is structured to receive client requests from client machines (e.g., the first client machine 102, the second client machine 104, and the third client machine 106) via the network 108. In the present example, the cloud storage system 110 is structured as a computing device, such as a rack mount server, desktop computer, laptop computer, or other computing device. The cloud storage system 110 may also include a single computing device or multiple computing devices that are communicatively coupled, such as via the network 108. For example, the cloud storage system 110 may include a first plurality of machines that receive and process the client requests and a second plurality of machines that provide backend storage that is accessed by the first plurality of machines to perform data I/O operations.

The cloud storage system 110 is structured to create and run application instances 112 to handle the client requests. In the present example, applications instances 112 may be processes and/or tasks that run instructions of applications that are stored in the memory of the cloud storage system 110. For example, application instances 112 in the cloud storage system 110 may include instances of database applications, backup applications, virtual machine applications, hypervisor applications, and so forth. In some examples, client requests are handled at the cloud storage system 110 by receiving the client requests, instantiating a virtual machine application corresponding to each client request, and instantiating other applications on the virtual machine applications to process the client requests. Accordingly, each client may be associated with one or more application instances that are executing on the cloud storage system 110.

The cloud storage system 110 also includes a shared filesystem 114. In the present example, the shared file system is structured to create a local data partition corresponding to each client. In the present example, a local data partition is a partition that isolates a client from other clients. For example, a first local data partition 116 may be created that corresponds to the first client machine 102, a second local data partition 118 may be created that corresponds to the second client machine 104, and a third local data partition 120 may be created that corresponds to the third client machine 106. In some examples, a local data partition may appear from the perspective of a particular client to be a local filesystem that includes a directory structure and files. From the perspective of the cloud storage system 110, however, each local data partition may appear to be file and/or a device. In more detail, local data partitions may be created by structuring the shared filesystem 114 to include a loop device that is backed by a file that includes a local filesystem. The directory structure and files of the local filesystem may be provided to a client machine by mounting the loop device. Thus, for each client, a loop device may be configured on the shared filesystem 114 that provides access to shared data 124 provided by the filesystem 114.

In other examples, the client isolation that is provided by the first local data partition 116, second local data partition 118, and third local data partition 120 may be implemented by Application Programming Interfaces (APIs) and application instances that use these APIs.

In the present example, each local data partition is structured to include attributes, which may also be referred to as extended attributes and/or tags. The attributes are assigned to each of the local data partitions. For example, the attributes corresponding to each local data partition may be stored as metadata of each of the backing files that are configured to provide the local data partitions. In more detail, a backing file that provides a local filesystem to a first client machine 102 may include attributes that specify a client identifier corresponding to the first client machine 102, an application identifier corresponding to an application instance that the first client machine 102 is running to access the local filesystem provided by the backing file, and a SLO corresponding to the first client.

In the present example, attributes may include client identifiers, application identifiers, and/or SLOs. The shared filesystem 114 is structured to associate attributes with a local data partition at the time the local data partition is accessed by a client. The shared filesystem 114 is structured to access/receive these attributes each time a request is received to perform an I/O operation corresponding to a local data partition. These attributes are used by the shared filesystem 114 to schedule the requests relative to other requests, such as by ordering the requests within one or more data structures. In some examples, the data structures are a plurality of queues. Methods for scheduling requests based on the attributes are described further with respect to FIG. 3.

In the present example, the shared filesystem 114 is structured to include a journal 122. The shared filesystem 114 is structured to retrieve/dispatch requests from the one or more data structures to perform serialized I/O updates to the journal 122. In some examples, the journal 122 may include a full or partial copy of the shared data 124 that is written to by the requests. For example, the journal 122 may be structured as a Write-Ahead Log that stores changes corresponding to the requests, such as additions, modifications, and/or deletions to the shared data 124. Accordingly, the journal may be structured to aggregate and cache the writes corresponding to the requests.

In the present example, the shared data 124 represents information stored in a database and/or one or more files on a computer-readable storage medium corresponding to the cloud storage system 110. For example, the shared data 124 may be structured on a backend storage system that is configured to receive requests that are retrieved from the journal 122. The shared filesystem 114 is structured to manage the shared data 124 and perform I/O operations on the shared data 124, such as writing to the shared data 124 and retrieving the shared data 124.

In the present example, the shared filesystem 144 is structured to update the shared data 124 with the updates that are cached in the journal 122. For example, updates cached in the journal 122 may be flushed to the shared data 124 via write back requests, such that the updates are removed from the journal 122 and written to the shared data 124. In some examples, data stored in the journal 122 may be flushed to the shared data 124 in batches based on pre-defined criteria, such as fullness of the journal 122, importance of the updates, and so forth.

Figure 2:
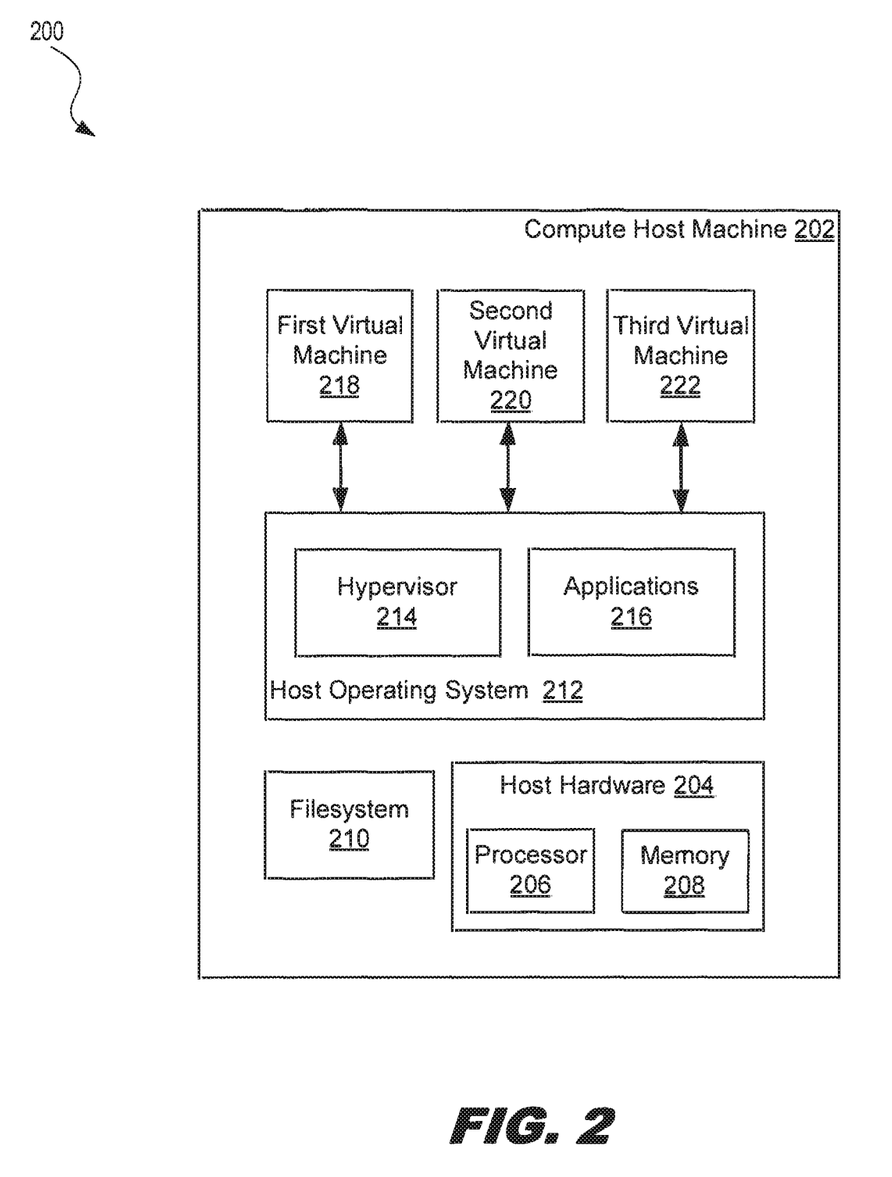
FIG. 2 is an organizational diagram illustrating a cloud storage system, in accordance with various examples of the present disclosure.

FIG. 2 is an organizational diagram illustrating a cloud storage system 200 in the form of a machine, within which a set of instructions may be executed to cause the machine to perform any one or more of the methodologies discussed herein.

In the present example, the cloud storage system 200 includes a compute host machine 202. While a single machine is illustrated, the term "machine" shall also be taken to include any collection of machines that individually or jointly execute a set (or multiple sets) of instructions to perform any one or more of the methodologies discussed herein. Thus, compute host machine 202 may include a single machine or multiple host machines arranged in a cluster. In more detail, the machine may be connected (e.g., networked) to other machines in a LAN, an intranet, an extranet, or the Internet. In some examples, the compute host machine 202 provides an architecture that implements the cloud storage system 110 that is described with respect to FIG. 1.

The compute host machine 202 may operate in the capacity of a server or a client machine in client-server network environment, or as a peer machine in a peer-to-peer (e.g., distributed) network environment. The compute host machine 202 may be a personal computer (PC), a tablet PC, a set-top box (STB), a Personal Digital Assistant (PDA), a cellular telephone, a web appliance, a server, a network router, switch or bridge, or any one or more machines capable of executing a set of instructions (sequential or otherwise) that specify actions to be taken by that machine.

In the present example, the compute host machine 202 includes host hardware 204. Host hardware 204 includes physical elements such as a processor 206, memory 208, and other hardware components (e.g., a network interface device, keyboard, display, input devices, and so forth). Hardware elements such as the processor 206 and memory 208 may communicate with each other via a bus.

In the present example, the processor 206 represents one or more general-purpose processing devices such as a microprocessor, central processing unit, and the like. In more detail, processor 206 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 206 may also be one or more special-purpose processing devices such as an application specific integrated circuit (ASIC), a field programmable gate array (FPGA), a digital signal processor (DSP), network processor, or the like. In the present example, processor 206 is configured to execute instructions for performing the operations and steps discussed herein.

In the present example, the memory 208 represents a main memory (e.g., read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and/or data storage device. Memory 208 may include a computer-readable storage medium on which one or more sets of instructions (e.g., software) are stored embodying any one or more of the methodologies or functions described herein. The instructions may reside, completely or at least partially, within memory 208 and/or within processor 206 during execution of the instructions by processor 206. The instructions may further be transmitted or received over a network via a network interface device.

The term "computer-readable storage medium," as used above, may refer to any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. While memory 208 is shown in an example to be a single medium, the term "medium" should be taken to include a single medium or multiple media (e.g., a centralized or distributed database, and/or associated caches and servers) that store the one or more sets of instructions.

Compute host machine 202 includes a filesystem 210 that is structured to manage data of the compute host machine 202 that is stored in the memory 208. For example, as is illustrated and described with respect to the shared filesystem 114 of FIG. 1, the filesystem 210 may be shared with a plurality of clients that each access the filesystem 210 via partitions. Further, the filesystem 210 may include a journal to cache and/or aggregate filesystem updates and commit the updates to the memory 208. In the present example, the filesystem 210 is structured to schedule requests to perform I/O that are received by the filesystem 210 from clients. Methods of scheduling of requests by a filesystem are described in more detail with respect to FIG. 3.

Compute host machine 202 includes a host operating system 212 that may be stored on the memory 208 and executed by the processor 206. The host operating system 212 may be structured to install and execute a hypervisor 214 and applications 216. Applications 216 may be executed by assigning tasks/processes to the applications 216 that execute instructions corresponding to the applications 216. These tasks/processes that execute instructions corresponding to the applications 216 may be referred to as instances of the applications. Examples of applications 216 include, for example, the hypervisor 214, database applications, data backup applications, and so forth. In other examples, hypervisor 214 may run directly on host hardware 204 without the use of a host operating system.

In the present example, hypervisor 214 is implemented as a software application and is executed to instantiate one or more virtual machines, such as the first virtual machine 218, the second virtual machine 220, and the third virtual machine 222. Although three virtual machines are shown, there may be any number of virtual machines that are instantiated by the hypervisor 214. Hypervisor 214 manages access of virtual machines to system resources, such as processor 206, memory 208, and other host hardware devices. In the present example, each virtual machine is an underlying emulation of compute host machine 202. Each virtual machine may be, for example, a hardware emulation, full virtualization, para-virtualization, and operating system-level virtualization virtual machine.

In the present example, each virtual machine may include a virtual CPU, virtual memory, one or more virtual devices, such as a network device, an emulated NIC or disk, physical devices over which a guest operating system is given partial or full control, virtual firmware such as a Basic Input/Output System (BIOS) and/or an Extensible Firmware Interface (EFI), and so forth.

Figure 3:
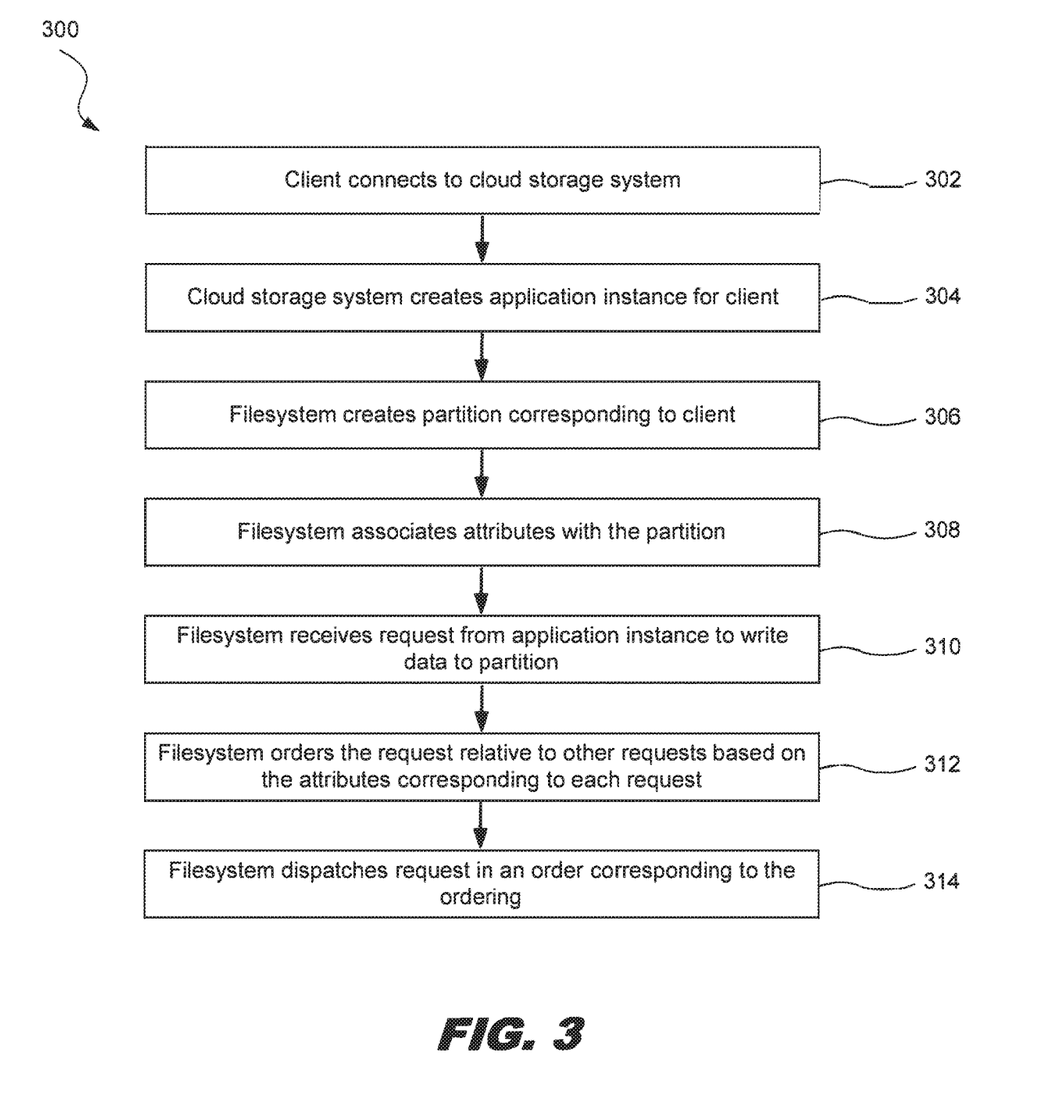
FIG. 3 is a flow diagram showing an illustrative scheduling of an I/O request, in accordance with various examples of the present disclosure.

FIG. 3 is a flow diagram illustrating a method 300 for scheduling an I/O request, according to some examples of the present disclosure. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. In some examples, the method 300 is performed by the shared filesystem 114 described with respect to FIG. 1 and/or the filesystem 210 that is described with respect to FIG. 2. In some examples, the order of the actions described below may also be performed according to alternative orderings. In yet other examples, additional actions may be added and actions that are described may be removed.

At action 302, a client connects to a cloud storage system. In some examples, the connection is provided by a client machine communicating a connection request via a network to a compute host machine of the cloud storage system.

In the present example, the client connects via a user sign in process that includes the client specifying a client identifier, such as a username. In other examples, the cloud storage system may match a client identifier to the client based on an originating address corresponding to the client, a particular username being used to sign into the cloud storage system, or a matching between other information provided by the client. In some examples, the connection between the client and the cloud storage system may include establishing a session.

At action 304, the cloud storage system instantiates an application and assigns the application instance to the client. In the present example, instantiating an application may refer to creating a task/process that is structured to execute instructions corresponding to the application. The process may be referred to as the application instance. For example, the cloud storage system may provide a virtual machine application instance, a database application instance, a backup instance, and/or other application instances.

At action 306, the filesystem of the cloud storage system creates a storage partition corresponding to the client. In the present example, the storage partition includes a directory structure and one or more files, a database, and/or other data structure that is provided to the client. In the present example, the storage partition may be created by providing a loop device that is backed by a file, which may be referred to as a backing file. In the present example, the cloud storage system mounts the loop device, thereby making the storage partition available to the user. The storage partition provides access to directories and/or files of a filesystem that is shared between a plurality of clients. The filesystem that is made available to the user as a storage partition may be referred to as a local data partition. Accordingly, by mounting the loop device, the application instances assigned to the client are able to access data corresponding to the filesystem, such as files that are stored within the filesystem, database entries stored within a database provided by the filesystem, and so forth. Each client may be assigned to a different storage partition that includes attributes specific to each client, such that the filesystem may isolate each clients' requests to its assigned storage partition. For example, the storage partitions may be described as isolating the clients because clients may be restricted from accessing storage partitions assigned to other clients. However, even though the storage partitions provide isolation features, the storage partitions may provide access to shared data, such that data accessible via a first partition may also be accessible via another storage partition. While the loop device is provided as an example of a way to provide partitioning to isolate clients from other clients, other partitioning methods may also be used.

At action 308, the filesystem associates attributes corresponding to the client with the created storage partition. These attributes may include but are not limited to: the client identifier; an identifier corresponding to the application (such as a name or category corresponding to the application); and a SLO corresponding to the client.

In some examples, a SLO corresponding to the client includes one or more thresholds that the cloud storage system is expected to meet for I/O requests of the client. For example, a SLO may specify that the cloud storage system is expected to process a percentage threshold of I/O requests corresponding to a particular application within a particular time threshold. As merely one example, an SLO may specify that at least 99% of I/O requests corresponding to a database application are expected to each be completed within ten microseconds. Other percentage thresholds, applications, and time thresholds may also be configured. These thresholds may be configured prior to the client connection based on particular SLOs that are agreed upon between a client and a provider of the cloud storage system. In other examples, these SLOs may be configured and/or modified dynamically during a client connection.

In some examples, the attributes may be associated with the storage partition by storing the attributes as metadata of the backing file that is mounted to provide the storage partition to the client. In other examples, the attributes may be stored in a database or other data structure.

At action 310, the filesystem receives an I/O request from an application instance of the client to access data in the storage partition. In the present example, the I/O request is a request from a particular application instance assigned to the client to perform a write to a file that is included in the storage partition.

In some examples, the filesystem provides a hierarchy corresponding to the applications, such that if a first application instance and a second application instance both access the storage partition, the hierarchy determines which application identifier is to be associated with the storage partition based on the hierarchy. For example, if a client is provided a virtual machine instance that runs a database instance to send a request to the storage partition, there may be two application identifiers corresponding to the request to access the storage partition. In some examples, the application identifier that is assigned as the attribute of the storage partition may be determined based on the hierarchy (e.g., the database application identifier may have higher priority than the virtual machine application identifier). In other examples, the application identifiers corresponding to both the virtual machine instance and the database instance may be associated with the storage partition.

In the present example, after receiving the request and responsive to the request, the filesystem accesses the attributes corresponding to the partition to which the request is directed. These attributes may be parsed and/or retrieved from the metadata corresponding to the backing file that provides the storage partition. For example, the filesystem may retrieve the client identifier, application identifier, and SLO corresponding to the I/O request.

At action 312, the filesystem stores the I/O request in a data structure in an order relative to other received I/O requests. The I/O requests from the clients are ordered within the data structure based on the attributes corresponding to each I/O request and the order in which the I/O requests were submitted. In the present example, the ordering of the I/O requests provides an order in which the I/O requests are scheduled for dispatch from the data structure for further processing.

In some examples, the I/O requests may be ordered within a data structure that includes one or more queues. For example, a high-priority queue and a low-priority queue may be provided. Requests may be processed from the high-priority queue more frequently than requests that are stored in the low-priority queue. To determine the queue to which each request is assigned, the client identifier associated with each request may be received from the attributes of the partition to which the request is directed, and compared with one or more sets of client identifiers to identify whether the request is to be placed into the high-priority queue or the low-priority queue. For example, a set may be maintained by the filesystem that specifies high-priority client identifiers and another set may specify low-priority client identifiers. Accordingly, the set to which the client identifier is matched may determine the queue into which the request from the client is placed.

In this example, I/O requests may be further ordered within the high-priority queue and the low-priority queue based on the application identifier attribute of the partition to which each request is directed. For example, within the high-priority queue, I/O requests from application instances that are latency sensitive may be ordered to be processed prior to application instances that are not latency sensitive. For example, latency sensitive applications may include hypervisor applications and database applications. Non-latency sensitive applications may include backup applications and/or other applications that do not have defined SLOs. In some examples, applications that do not have defined SLOs may default to a lower priority than applications that have defined SLOs. The application identifier associated with each request may be received from the attributes of the partition to which each request is directed, and compared with one or more sets of application identifiers to identify whether the request is associated with a latency sensitive (and/or other prioritized) application or a non-latency sensitive (and/or other non-prioritized) application. For example, a set may be maintained by the filesystem that specifies latency sensitive application identifiers and another set may specify non-latency sensitive application identifiers. Applications may be classified as prioritized or non-prioritized based on any number of other criteria in addition to or instead of latency-sensitivity. Accordingly, the set that the application identifier is matched to will determine the positioning in the queue of the request relative to other requests (e.g., from the client and/or other clients).

Further, the order in which the requests were submitted by the application instances may also determine the ordering within the queues. For example, within the high-priority queue and the low-priority queue, requests from latency sensitive applications may be further sorted based on submission time, such that the earlier submitted requests are scheduled for dispatch from the queues prior to the later submitted requests. Similarly, within the requests corresponding to the non-latency sensitive applications, the earlier submitted requests are scheduled for dispatch prior to the later submitted requests.

In other examples, the requests may be ordered within a same queue, with requests associated with particular client identifiers and application identifiers being prioritized over requests associated with other client identifiers and application identifiers. In yet other examples, queues may be provided corresponding to each application identifier, with requests sorted within the queues based on the client identifiers and time of submission.

At action 314, the requests are dispatched from the data structure, which in the present example includes removing the requests from one or more queues and performing further processing on the requests. For example, a request may be received from the data structure and processed to write data to a journal and/or filesystem that is shared by a plurality of clients. In examples where the data structure includes a queue, dispatching a request may include pushing the request from the queue. In the present example, requests are processed from the one or more queues according to the ordering, such that requests are prioritized over other requests based on partition attributes that the requests are directed to, where the attributes may include one or more of: the client identifier, application identifier, a SLO, and time of submission to the queues. Requests that are prioritized may be positioned ahead of non-prioritized requests, such that the prioritized requests are scheduled for earlier dispatch from the queues. Accordingly, by processing requests from the front of the queue, the requests may be serialized and processed according to the ordering.

In the present example, an I/O request that is located at the front of a queue is processed by receiving the client identifier, application identifier, and SLO associated with the request, and determining whether the SLO is over-achieved or under-achieved. In more detail, the SLO corresponding to the request may be compared with heuristics that track SLO compliance. For example, upon completing each request, the filesystem may update the heuristics with the processing time corresponding to the request. In some examples, a request is considered completed when the request has been dispatched from the data structure and written to shared data of the filesystem. In other examples, a request may be considered completed when data corresponding to the request has been written to a journal or other cache. Accordingly, the filesystem may access the heuristic corresponding to the SLO associated with the request and identify whether the SLO is over-achieved or underachieved. The SLO may be over-achieved, for example, if the requests corresponding to the SLO have completed faster than the expected processing time. The SLO may be under-achieved, for example, if the requests corresponding to the SLO have completed slower than the expected processing time. If the heuristics show that the SLO is over-achieved, the I/O request may be pushed backward in the queue, and the filesystem may then process the next request that is at the front of the queue. If the SLO is under-achieved, the I/O request may be retrieved from the queue for further processing. Pushing requests backward in the queue for over-achieved SLOs may be referred to as de-prioritizing the requests, while processing the requests from the queue for under-achieved SLOs without pushing the requests backward in the queue may be referred to as prioritizing the requests.

In some examples, the I/O request is further processed by submitting the I/O request to a journal that is shared with the other clients. The journal may operate to cache/buffer the I/O requests. The filesystem may then process I/O requests from the journal to update the shared memory. In some examples, the I/O requests are processed from the journal in batches, while in other examples single I/O requests may also be processed. In yet other examples, depending on preconfigured conditions, I/O requests may be batched with other requests or processed without being batched with other requests. For example, requests from particular applications such as data backup applications may be batched, which may include aggregating the requests, while requests from a hypervisor may be processed without batching the requests with other requests.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
    creating an application instance that corresponds to a client;
    creating a partition on a cloud storage device, the partition corresponding to the client;
    associating attributes with the partition, the attributes including a client identifier corresponding to the client, a service-level objective corresponding to the client, and an application identifier corresponding to the application instance;
    receiving a request from the application instance to access the partition;
    accessing, in response to the request, the attributes corresponding to the partition;
    ordering the request in a data structure relative to one or more other requests based on determining whether the service-level objective is over-achieved or under-achieved by comparing the service-level objective corresponding to the request with heuristics that track service-level objective compliance, the ordering based on at least one attribute of the attributes, an order in which the request was submitted, and a latency sensitivity of the application instance; and
    dispatching the request from the data structure in an order corresponding to the ordering.

2. The method of claim 1, wherein requests from application instances that are latency sensitive are ordered to be processed prior to application instances that are not latency sensitive.

3. The method of claim 1, further comprising de-prioritizing the request in the ordering in response to determining that the service-level objective is over-achieved.

4. The method of claim 1, further comprising prioritizing the request in the ordering in response to determining that the service-level objective is under-achieved.

5. The method of claim 1, further comprising:
    determining that the application identifier corresponds to one or more of the following: (1) a backup application; and (2) an application that does not have a defined service-level objective;
    based on the determining, aggregating the request with a plurality of requests that are associated with the application identifier; and
    after a threshold amount of requests are aggregated, dispatching the request and the plurality of requests in a batch.

6. The method of claim 1, further comprising:
    determining that the application identifier corresponds to a database application, a hypervisor, or another application that includes a defined-service level objective; and
    based on the determining, prioritizing the request in the ordering.

7. The method of claim 1, further comprising:
    determining that the application identifier corresponds to a backup application or an application that does not have a defined service-level objective; and
    based on the determining, de-prioritizing the request in the ordering.

8. A method comprising:
    creating an application instance that corresponds to a client;
    receiving a request from the application instance to access a partition that is assigned to the client, the partition providing access to a shared filesystem;

associating an attribute with the partition, the attribute selected from the group consisting of: a client identifier corresponding to the client, a service-level objective corresponding to the client, and an application identifier corresponding to the application instance;

receiving a request from the application instance to perform an operation corresponding to the partition;

accessing, in response to the request, the attribute corresponding to the partition;

ordering the request in a data structure relative to one or more other requests based on the attribute, the order in which the request was submitted, and the service-level objective, wherein the ordering comprises comparing the service-level objective corresponding to the request with heuristics that track service-level objective compliance;

dispatching the request from the data structure according to the order.

9. The method of claim 8, further comprising:
determining that the application instance is not latency sensitive; and
based on the determining, de-prioritizing the request in the ordering.

10. The method of claim 8, further comprising:
determining that the application instance is latency sensitive; and
based on the determining, prioritizing the request in the ordering.

11. The method of claim 8, further comprising:
determining that the service-level objective is over-achieved; and
based on the determining, de-prioritizing the request in the ordering.

12. The method of claim 8, further comprising:
determining that the service-level objective is under-achieved; and
based on the determining, prioritizing the request in the ordering.

13. The method of claim 8, wherein the data structure includes a first queue and a second queue, wherein a first plurality of requests corresponding to a first partition are assigned to the first queue, and wherein a second plurality of requests corresponding to a second partition are assigned to the second queue.

14. The method of claim 13, wherein the first plurality of requests that are assigned to the first queue are prioritized over the second plurality of requests that are assigned to the second queue.

15. A system comprising:
a processor and a memory;
a data structure stored in the memory that includes a plurality of requests;
an application instance executed by the processor that inserts a request of the plurality of requests into the data structure;
a partition that is assigned to a client, the partition associated with attributes that include: a client identifier, a service-level objective, and an application identifier corresponding to the application instance; and
a filesystem that accesses the attributes corresponding to the partition, in response to receiving a request to perform an operation corresponding to the partition, and orders the request relative to the other requests of the plurality of requests based on the attributes, an order in which the request was submitted, and a service-level objective of the application instance;
wherein to order the request relative to the other requests, the system is to compare the service-level objective corresponding to the request with heuristics that track service-level objective compliance.

16. The system of claim 15, wherein requests from application instances that are latency sensitive are ordered to be processed prior to application instances that are not latency sensitive.

17. The system of claim 15, wherein the file system is further to:
determine that the service-level objective is over-achieved; and
based on the determining, de-prioritize the request.

18. The system of claim 15, the filesystem further to:
determine that the service-level objective is under-achieved; and
based on the determining, prioritize the request.

* * * * *